(No Model.)
C. HIESTAND.
CULTIVATOR.
No. 463,229. Patented Nov. 17, 1891.
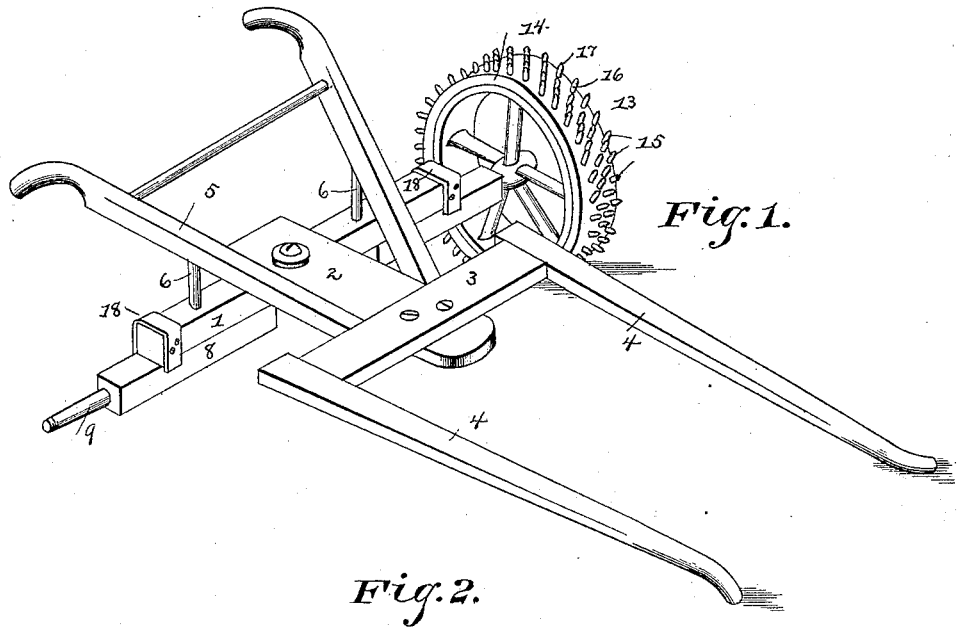
Fig. 1.
Fig. 2.
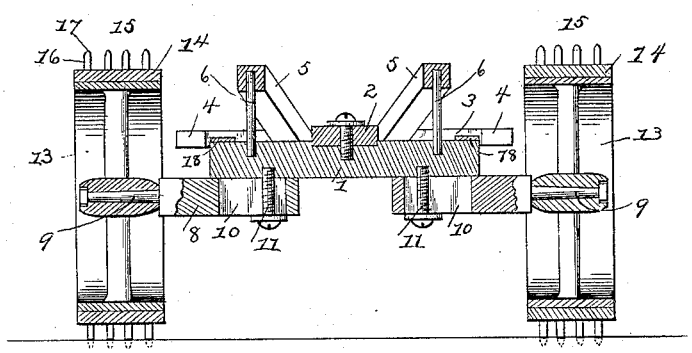
Fig. 3.
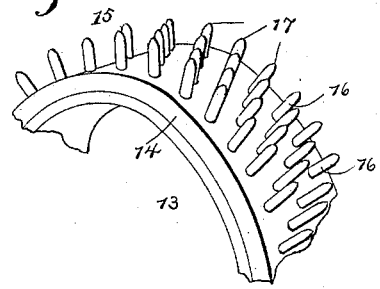
Witnesses:
B. S. Ober
W. S. Duvall
Inventor
Charles Hiestand
By his Attorneys,
C. A. Snow & Co.

UNITED STATES PATENT OFFICE.

CHARLES HIESTAND, OF SPINNERSTOWN, PENNSYLVANIA.

CULTIVATOR.

SPECIFICATION forming part of Letters Patent No. 463,229, dated November 17, 1891.

Application filed May 21, 1891. Serial No. 393,629. (No model.)

*To all whom it may concern:*

Be it known that I, CHARLES HIESTAND, a citizen of the United States, residing at Spinnerstown, in the county of Bucks and State of Pennsylvania, have invented a new and useful Cultivator, of which the following is a specification.

This invention relates to an improved agricultural implement of the cultivator class.

The objects of the invention are to provide a cheap and simple machine designed to be run over the ground after heavy rains and hot suns to pulverize or perforate the crust that is formed by the sun after such rains, and thereby expedite the sprouting of the seed planted under the crust.

A further object of the invention is to provide for adjusting the device to operate upon rows of varying distances apart.

With the above objects in view the invention consists in certain features of construction hereinafter specified, and particularly pointed out in the claim.

Referring to the drawings, Figure 1 is a perspective of an implement constructed in accordance with my invention. Fig. 2 is a transverse section through the axle of the same. Fig. 3 is a detail of a portion of the periphery of the wheel, the perforating pins or studs thereon being exaggerated.

Like numerals of reference indicate like parts in all the figures of the drawings.

1 designates the transverse bolster of the implement, and from the center of the same extends the draft-bar 2, to which is connected the singletree 3, having the shafts 4. Handles 5 are connected with and extend rearwardly from the opposite sides of the draft-bar above and beyond the transverse bar or bolster 1, and are supported by short standards 6, extending from the bolster to the handles.

8 designates a pair of axle-sections rectangular in cross-section, with the exception of their reduced bearing ends 9, said axle-sections being slotted near their inner ends, as at 10, for the reception of bolts 11, passed upwardly through the slots and terminating in the bolster or transverse bar 1. By loosening the nuts 11 of the bolts the axle-sections are loosened and may be adjusted, after which a retightening of the same locks them in their adjusted positions.

13 designates the wheels, which are provided with broad iron tires 14, and each tire is studded around its entire periphery with series of alternately-arranged teeth 15. These teeth are in reality spikes, in that they have cylindrical body portions 16, and are pointed at their ends, as at 17, and the same radiate from the center of the wheel.

As is well known among agriculturists, heavy rains followed by hot suns serve to bake or incrust the soil, the crust oftentimes being hard and preventing the sprouting of seed planted therein. Such incrustation should be broken or pierced in some manner to aid the seed in sprouting, and for this purpose I have devised the finely-studded wheels 13, the studs being just long enough to penetrate the ground, and each leaving an elongated perforation through which the seed may sprout and through which moisture may pass. The bolster at its ends is provided with depending U-shaped keepers 18, which embrace the opposite axle-sections and serve to guide them in their adjustments.

Having thus described my invention, what I claim is—

In a machine of the class described, the combination, with the bolster or cross-bar and the keepers depending from the same, of the slotted axle-sections, bolts passing through the slots into the bolster and provided with nuts, opposite wheels mounted on the axle-sections and having their peripheries provided with radiating pins having cylindrical bodies and tapered points, and the draft and frame bar, substantially as specified.

In testimony that I claim the foregoing as my own I have hereto affixed my signature in presence of two witnesses.

CHARLES HIESTAND.

Witnesses:
JOHN A. OZIAS,
RAMON E. OZIAS.